United States Patent [19]

Benson

[11] 4,033,526
[45] July 5, 1977

[54] AERODYNAMIC FLOW BODY

[76] Inventor: William Benson, P.O. Box 5194, San Bernardino, Calif. 92408

[22] Filed: Mar. 15, 1976

[21] Appl. No.: 667,245

Related U.S. Application Data

[63] Continuation of Ser. No. 474,938, May 31, 1974, abandoned.

[52] U.S. Cl. .................. 244/15; 244/36; 244/209
[51] Int. Cl.² ........................... B64C 15/02
[58] Field of Search .......... 244/15, 23 R, 36, 45 R, 244/53 B, 55, 47, 12 R, 13, 42 C, 12.1

[56] References Cited

UNITED STATES PATENTS

| | | | |
|---|---|---|---|
| 2,039,179 | 4/1936 | Mazzini | 244/42 C |
| 2,586,299 | 2/1952 | Burnelli | 244/15 |
| 2,696,953 | 12/1954 | Lippisch | 244/15 |
| 3,097,817 | 7/1963 | Towzey | 244/15 |
| 3,281,095 | 10/1966 | Runge | 244/42 C |
| 3,430,446 | 3/1969 | McCloy | 244/15 X |
| 3,478,989 | 11/1969 | Bielefeldt | 244/55 X |
| 3,576,300 | 4/1971 | Palfreyman | 244/36 |

FOREIGN PATENTS OR APPLICATIONS

| | | | |
|---|---|---|---|
| 756,054 | 8/1956 | United Kingdom | 244/12 R |
| 1,028,602 | 5/1966 | United Kingdom | 244/36 |
| 934,286 | 8/1963 | United Kingdom | 244/47 |

Primary Examiner—Trygve M. Blix
Assistant Examiner—Barry L. Kelmachter
Attorney, Agent, or Firm—Nilsson, Robbins, Dalgarn & Berliner

[57] ABSTRACT

Disclosed is an increased lift aircraft or similar device having an airfoil shaped forward structure. A mass flow engine, such as a jet engine, is positioned to the rear of this structure. In operation, the intake air flow for the engine flows around the forward structure, generating lift.

8 Claims, 8 Drawing Figures

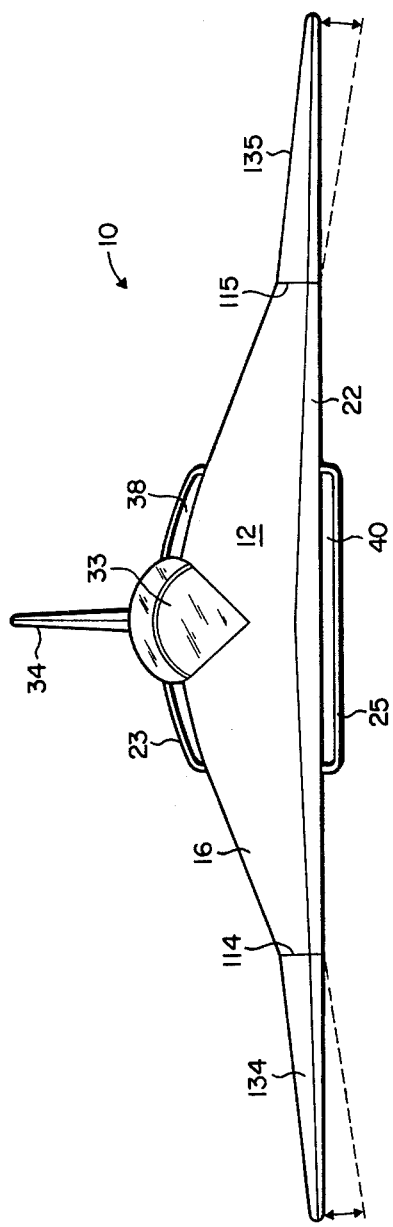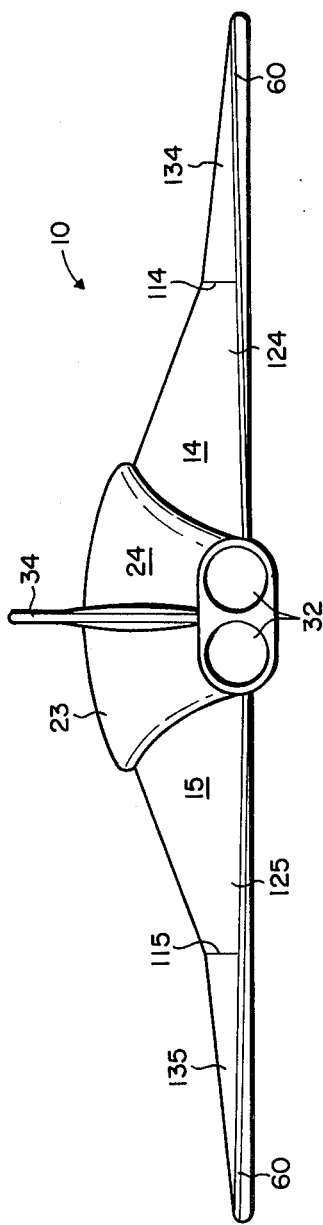

AERODYNAMIC FLOW BODY

This is a continuation, of now abandoned application Ser. No. 474,938, filed May 31, 1974.

BACKGROUND OF THE INVENTION

1. Field of the Invention

This invention relates to aircraft and similar structures, and in particular, to such devices utilizing mass flow engines in which large quantities of air are ingested and then expelled.

Description of the Prior Art

Conventional aircraft derive lift through the utilization of wings. A wing is an airfoil-shaped structure which provides lift to the aircraft as a result of the reaction to relative air flow about its surfaces. Relative air flow about the surfaces necessary for flight is normally provided by means of engines which propel the aircraft in a forward direction through the ambient air. In the absence of this forward motion, no air flow is generated, and no lift is provided.

Aircraft lift augmentation is normally provided by auxiliary engines, such as JATO's, which provide added thrust to the normal takeoff thrust provided by the main aircraft engines. These are wasteful, since the added lift is created by increased aircraft acceleration, brought about by added thrust provided by the rapid combustion of large quantities of fuel, rather than by more effective application of aerodynamic principles.

SUMMARY OF THE INVENTION

An object of the present invention is to provide an aircraft having lift in a stationary mode and increased lift at very low speeds.

A further object of the present invention is to provide an aircraft capable of short take offs and landings without utilizing increased power.

A still further object of the present invention is to provide an aircraft with improved handling and performance, particularly at low speeds.

Another object of this invention is to provide an improved aircraft lift augmentation device.

An additional object of this invention is to provide an improved engineless aircraft.

In accordance with the present invention, an aircraft or similar device is provided with an airfoil-shaped forward structure. In powered embodiments, a mass flow engine such as a jet engine or high mass flow propulsion system, as disclosed and claimed in my copending U.S. application, Ser. No. 338,280 now abandoned, but incorporated into a Continuation-in-part application Ser. No. 541,350, is positioned to the rear of the structure. The air intake passages for the engine are positioned so as to generate air flow around the forward structure and, thereby, generate lift.

Still other objects, features and advantages of the invention will become apparent to those skilled in the art from the following description when read in connection with the accompanying drawing.

BRIEF DESCRIPTION OF THE DRAWING

FIG. 4 is a head-on view of an aircraft according to the preferred embodiment of the invention;

FIG. 5 is a rear view of an aircraft according to the preferred embodiment of the invention;

DESCRIPTION OF THE PREFERRED EMBODIMENT

Figure 3:
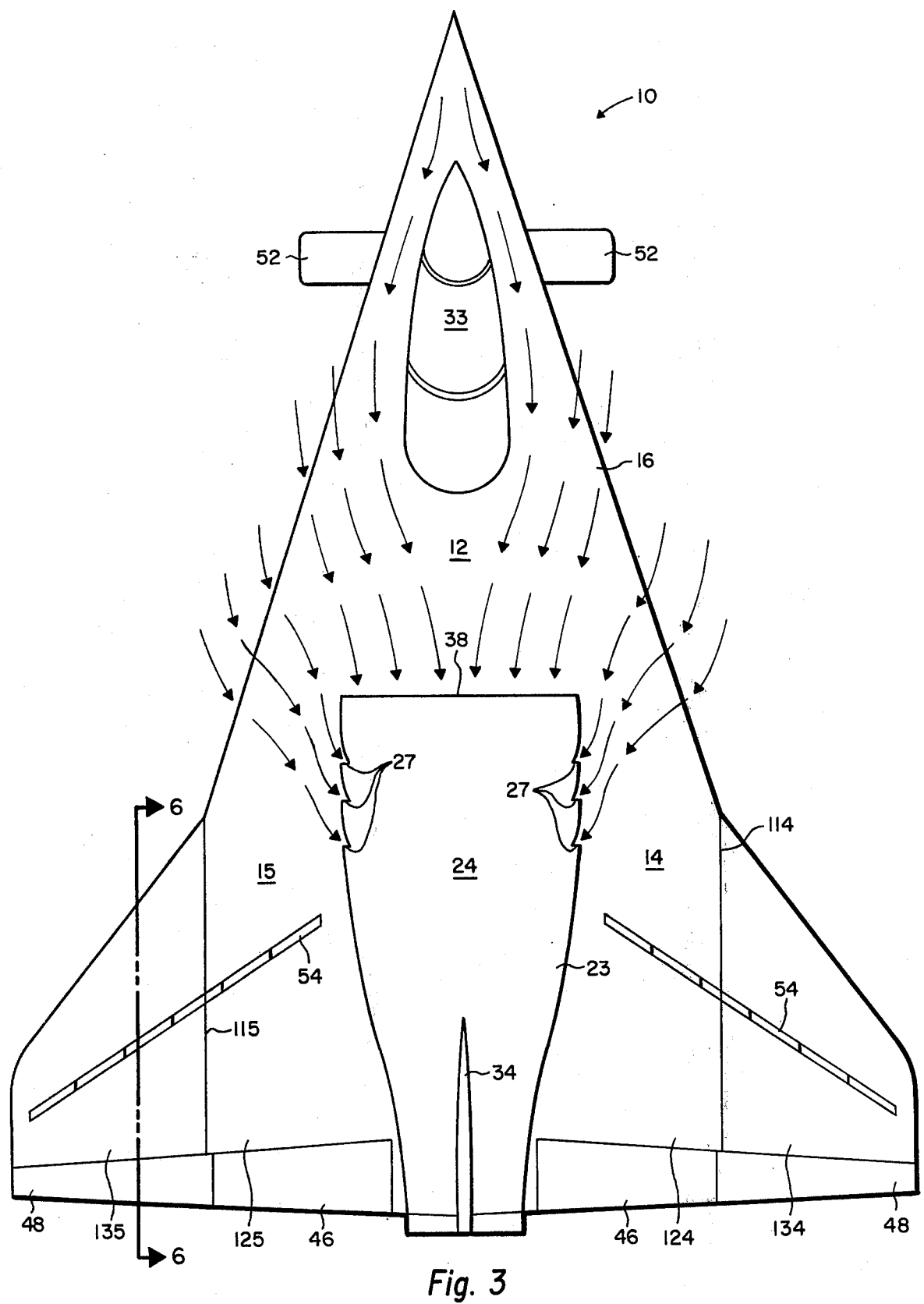
FIG. 3 is a plan view of an aircraft according to the preferred embodiment of the present invention showing typical airflow patterns while the aircraft is stationary with the engine operating.

Referring now to FIG. 3, there is shown a plan view of a powered aircraft 10 according to the preferred embodiment of the present invention. Superimposed onto this view are arrows indicating air flow patterns over the forward section 12 which would be observed under conditions wherein the engine 26, housed within the aft section 24, is operative. As will be pointed out below, this placement of the engine relative to the airfoil-surfaced forward section causes airflow over the latter, thus generating lift even while the aircraft is stationary.

The forward structure 12 comprises the main body of the craft 10.

The right airfoil-shaped outer panel 14 and a corresponding left outer panel 15 on the opposite side of the craft provide conventional wing-type lift, to augment that provided by the forward structure 12, while the aircraft 10 is in forward motion. As shown in FIGS. 3, 4 and 5, the outer panels may, themselves, be divided by a right hingeline 114 and a left hingeline 115. The hingelines divide the right outer panel into a right inner region 124 and a right outer region 134, while the left outer panel is divided into a left inner region 125 and a left outer region 135. The outer regions may be angularly displaced, as shown in FIG. 4, by means of a suitable mechanism, for flight control purposes.

The forward structure 12 has a double-contour cross-section, comprising an upper surface 16, from the nose 18 to the trailing edge 20, and a underside 22 from the nose 18 to the trailing edge.

In operation, the forward structure 12 is caused to present an airfoil surface in cross-section. This can be accomplished in any conventional manner which provides an air flow path over the upper surface 16 which is of greater velocity or higher mass flow than that under the lower surface 22, so that lift can be created by differential forces on the forward structure 12, according to the well known Bernoulli relationships.

Figure 1:
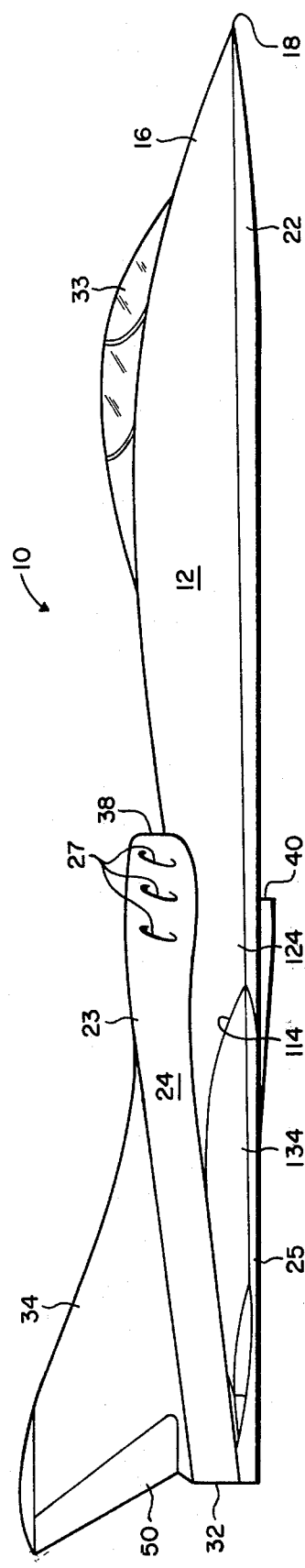
FIG. 1 is a side elevation view of an aircraft according to the preferred embodiment of the present invention.

There are numerous methods, all familiar to those skilled in the aerodynamic art, by which this may be accomplished. Preferably, the actual curved length of the lower surface 22 should simply be less than that of the upper surface 16, i.e., the lower surface should be "flatter," as in the case of an ordinary airplane wing, and as shown in FIG. 1.

Figure 2:
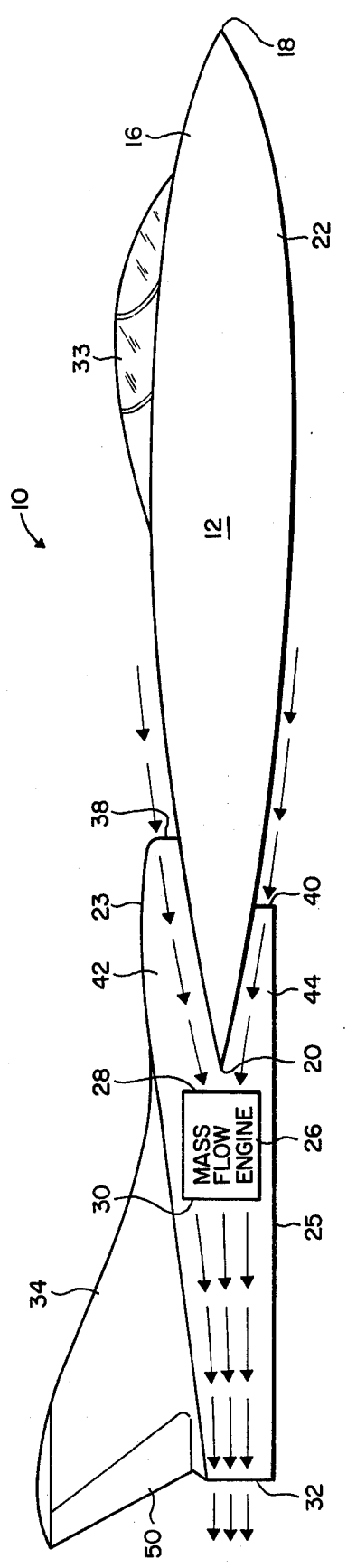
FIG. 2 is a cutaway side elevational view of an aircraft according to the present invention illustrating an alternative embodiment.

This effect can also be created by providing a symmetric cross-section, as shown in FIG. 2, by manipulating the horizontal stabilization controls of the aircraft, when it is in flight, or the forward landing gear (not shown) when the aircraft is on the ground, thus causing the forward structure 12 (or, indeed, the whole aircraft 10) to pitch upward, increasing the attack angle and creating a "virtual" airfoil surface. Such a configuration is well-known in the art, as is the fact that the attack angle of the forward structure, with respect to the forward velocity vector, should be made to decrease, as the aircraft velocity increases.

Housed in the aft section 24 of the aircraft 10, is a mass flow engine 26. The mass flow engine contains an engine air intake port 28, and an engine exhaust port 30. The mass flow engine may comprise a turbine engine, a ramjet engine, a high mass flow propulsion system (e.g., such as that described in my aforementioned co-pending U.S. Pat. application) or any other engine which causes a volume of air to be ingested and then discharged through the exit port.

Of course, a plurality of engines 26 could be employed.

Top and bottom primary air intake openings 38 and 40, respectively, are provided to channel air through the channels 42 and 44, respectively, to the engine intake port 28 of the mass flow engine 26. Air is expelled into the ambient through a final exhaust port(s) 32.

Thus, the forward structure 12 of the aircraft 10 is that portion of the aircraft which is capable of creating lift while the aircraft is stationary or travelling at speeds lower than those required to generate lift by conventional means, I.e., the vacuum at the intake port 28 created by the expulsion of air from the engine(s) 26 creates a high mass flow of air through the channels 42, 44. This, in turn, creates an accelerated air flow over the upper surface 16 and lower surface 22 of the forward structure 12. This air flow creates the desired lift on the forward structure, said lift being totally independent of forward movement of the aircraft. In my device, ambient air is drawn over an airfoil surface to provide the necessary relative motion to create this lift. In other devices, this motion must be created by "pushing" or "dragging" the surface through the air.

It is this feature of my invention which creates the necessary lift to permit low speed (and, therefore, short runway) takeoffs and landings and to greatly improve the low speed handling qualities of the aircraft. It should be noted that this effect is achieved, not by the employment of increased thrust created by the consumption of a large quantity of fuel, but rather by the effective application of aerodynamic principles to the normal operation of the engine(s) 26.

As shown in FIG. 1, the air flow to the mass flow engine(s) 26 within the aft section 24 may be increased by the use of any number of side intakes 27, the aftmost of which should be placed slightly forward of the trailing edge 20 of the forward structure 12. This placement of the intakes insures that maximum air flow occurs over the surfaces of the forward structure 12, and, therefore, that maximum lift is provided thereby.

In cross-section, the aft section 24 presents an airfoil shape. During forward movement of the aircraft 10 its air flow over upper surface 23 and lower surface 25 generates lift in a conventional manner.

Therefore, in a sense, the forward structure 12, in combination with the aft section 24, provides an integrated center section of the aircraft 10. While the aircraft is stationary, with the engine(s) 26 in operation, only the forward structure provides lift. However, during any forward movement of the aircraft, both the forward structure and the aft section provide lift in combination as an aerodynamic center section. The lift generated by this system is also augmented, during forward movement of the craft, by the conventional lift provided by the forward movement of the airfoil outer panels 14 and 15 through the ambient and thereby permits takeoff and landing in shorter distances.

In effect, therefore, the aircraft 10 comprises a unitary aerodynamic lifting body in the nature of a wing, with a center section, comprising, in tandem, the forward structure 12 and the aft section 24, together with the outer panels 14 and 15.

The utilization of airflow into the mass flow engine(s) 26 to provide lift permits a reduction in the power required from the mass flow engine. Thus the invention permits the use of lower powered engines for equivalent takeoff and landing capability. This power reduction results in fuel economy and increased payload and range.

When operating at low speeds, an aircraft utilizing the present invention has improved handling and performance characteristics. In addition to producing an increase in the airflow around the forward structure 12, the configuration of this embodiment of the present invention increases the air flow around outer panels 14 and 15, since the motion of the air into the intake openings 38, 40 and side intakes 27 (if any) will, due to air viscosity and other factors, cause a general flow of air over the entire aircraft 10. The increased air flow over the outer panels 14 and 15 makes operation at low speeds equivalent to operation at higher speeds in conventional craft. It is well-known that an aircraft generally has poorer handling and performance characteristics at low speeds and that the increases air flow associated with higher speeds results in improved characteristics. Thus the present invention provides improved handling and performance characteristics at low speeds.

In order to control the aircraft 10, various control surfaces are provided. The elevators 46, and elevons 48 and the canard tail 52 (retractable as desired, ordinarily at higher speeds) provide pitch and roll control in a rather conventional manner. In the embodiment of my invention having a substantially symmetrically cross-sectioned forward section 12 (see FIG. 2), these control surfaces provide the necessary pitch of the craft to create the desired virtual airfoil surface during flight.

Yaw control is provided by a rudder 50 mounted on a vertical fin 34, ordinarily, in connection with manipulation of the elevators 46, elevons 48 and canard tail 52.

At relatively low speeds, the flow of air over the forward section 12 may not sustain itself over the entire length of the aircraft 10, from the nose 18 to the aft edges 60 of the outer panels 14, 15. In order to prevent this flow disruption, substantially spanwise slots 54 may be provided across the outer panels as shown in FIG. 3. The slots provide communication between the upper surfaces and lower surfaces of the outer panels.

The slots 54 may be closed by sliding plates 55 across them. This may be done at the will of the operator, for example by his activation of a hydraulic device, or they may be closed automatically by activation of a suitable mechanism by a signal from a pressure or, more typically, a speed-sensing device.

Figure 6A:
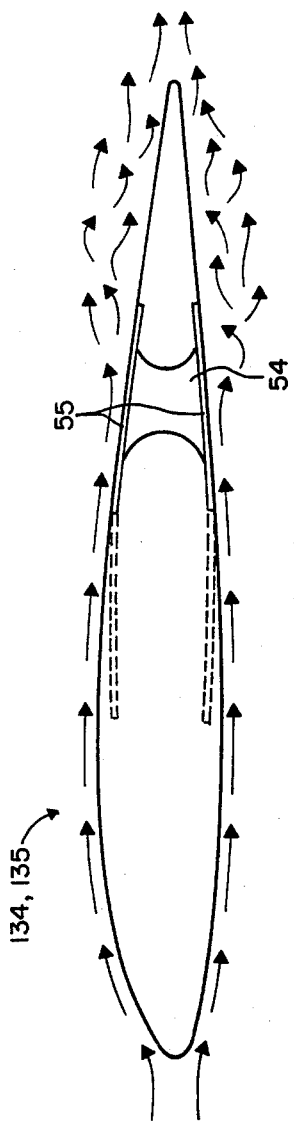
FIGS. 6A and 6B are views through Section 6—6 of FIG. 3, showing air flow around the outer panels of the aircraft shown therein, operated in two modes.
Figure 6B:
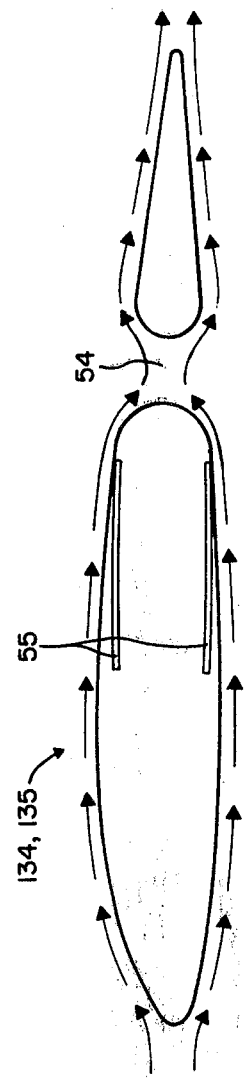

With the slots 54 in their closed position, the air flow over the outer panels 14 (and 15) is substantially as shown in FIG. 6A. In the open position, the flow is broken into two successive, substantially airfoil air flows (thus regenerating the "stagnating" air flow), as shown in FIG. 6B. Thus, with the slots in the open configuration, the aircraft 10 becomes, in effect, an "in-line by-plane." Such a configuration will clearly provide even greater lift and is particularly advantageous when employed in operation of the aircraft at low speed.

While the preferred embodiment of my invention comprises a powered aircraft 10 (this term, of course, includes miniature aircraft, remotely-piloted vehicles, and the like), the invention may also be implemented in other devices. For example, it might be employed as a lift augmentation device. In effect, such a device might be merely a miniaturized version of the aircraft 10 described above, without a cockpit 33 or pilot. Such a device could be incorporated within or force-transmissively (e.g., by means of a rigid suspension structure) connected to a conventional aircraft or, for that matter, to an aircraft 10 of the preferred embodiment of the present invention.

Furthermore, such a device would provide additional lift to an aircraft (i.e., as a lift augmentation device) if the engine(s) 26 were eliminated entirely, merely on account of its overall aerodynamic configuration.

The superior lift-to-drag ratio and low wing loading of an engineless craft constructed (except for the lack of any engine(s) 26) as in the case of the preferred embodiment of the invention, would render it highly suitable for powerless flight as a self-contained vehicle, such as a glider or earth re-entry vehicle. The lifting body nature of such a craft is dependent primarily on the shape of the device and not necessarily on whether or not it is powered.

Figure 7:
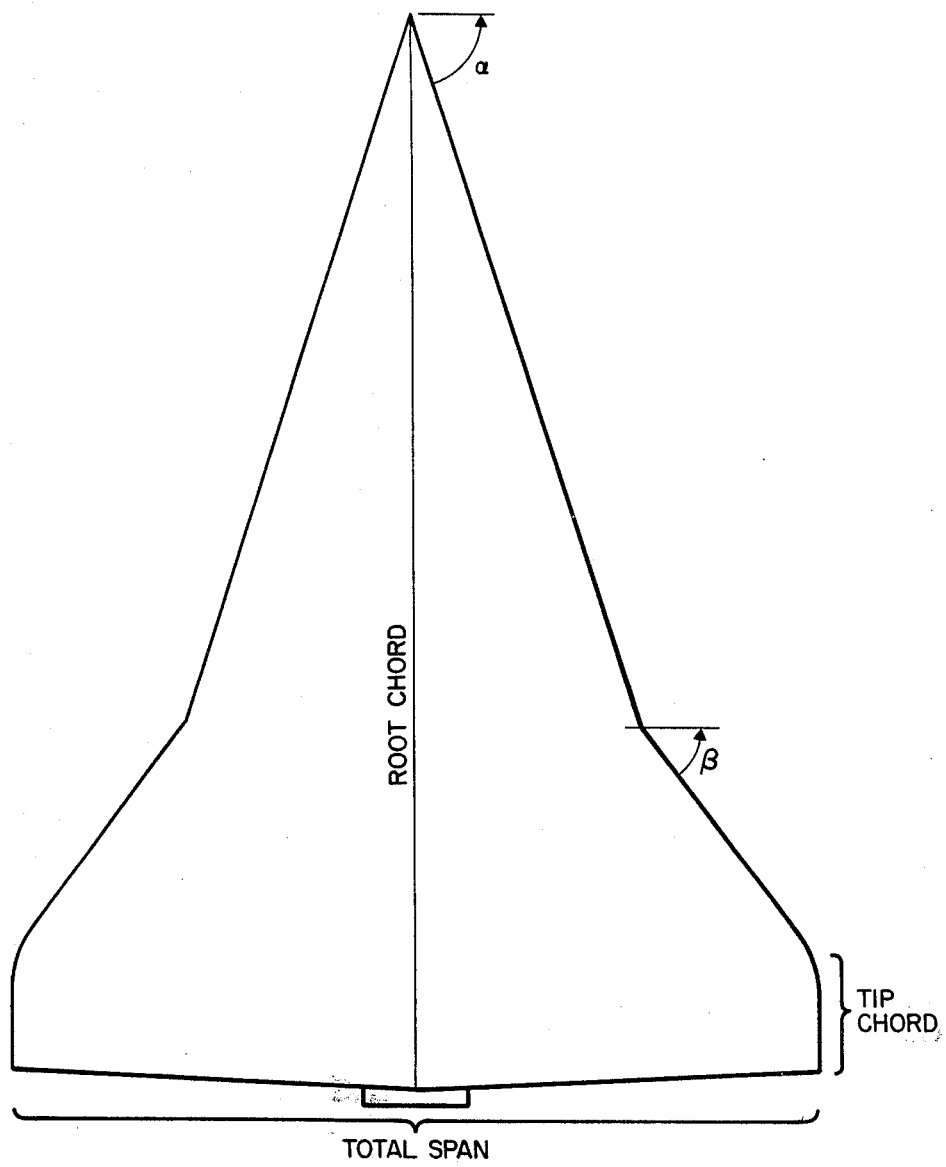
FIG. 7 is a schematic plan view of an aircraft according to the present invention, showing dimensional parameters.

Referring to FIG. 7, I have found that performance of the craft is improved if, in the planform of the embodiments described herein, the following are provided:

1. The forward section sweep angle, $\alpha$, should be approximately 75°.
2. The outer panel sweep angle, $\beta$, should be approximately 45°.
3. The ratio of the root chord to the total span should be in the order of 1.0 to 1.33.
4. The ratio of the tip chord to the root chord should be in the order of 1/20 to ⅛.

I claim:

1. Aerodynamic-lifting vehicle of the short take off and landing type having a longitudinal axis and a maximum dimension and having a bilaterally symmetric planform taken about the longitudinal axis thereof, said vehicle comprising:
   a forward section having upper and lower surfaces, said forward section being of substantially delta-shaped planform, said forward section presenting an airfoil shape in side elevation section;
   an aft section in tandem and integral with said forward section, said aft section presenting an airfoil shape in side elevation section;
   engine means mounted on said aft section and including a housing having inlet means positioned to induce airflow over said upper and lower surfaces of said forward section during operation of said engine means irrespective of motion of said vehicle;
   a line taken along the longitudinal axis from the forward tip of said forward section to the rear tip of said aft section defining the root chord of said vehicle;
   a pair of side panels, one of said side panels extending transversely from the longitudinal axis in either direction from said aft section of said vehicle, each of said side panels being of progressively increasing length, in a direction transverse to the longitudinal axis, from the forwardmost portion of said side panels aftward to at least one-half the distance of the aftmost portion of said side panels, the remainder of said side panels defining the tip chord of said vehicle, and each of said side panels presenting an airfoil shape in side elevation section;
   a line taken perpendicular to said root chord and along the maximum dimension of said vehicle across said aft section of said side panels defining the total span of said vehicle;
   the ratio of the root chord to the total span being between 1.0 and 1.33; and
   the ratio of the tip chord to the root chord being between 1/20 and ⅛.

2. A vehicle as recited in claim 1, wherein said housing includes ducting means positioned within said aft section and having a forward and an aft orifice, said forward orifice being positioned relative to said forward section so that under conditions of relative airflow with respect to said vehicle airflow is conducted across said upper and lower surfaces of said forward section, through said forward orifice, through said ducting means and caused to exit from said aft orifice.

3. A vehicle as recited in claim 2, further including means to control roll, pitch and yaw of said vehicle during flight.

4. A vehicle as recited in claim 3, wherein said engine means is disposed at least in part within said ducting means, said engine means adapted, upon activation thereof, to create a partial vacuum at said forward orifice, thereby causing said airflow over said upper and lower surfaces of at least part of said forward section and creating lift on said forward section of said vehicle when in a stationary condition, said lift being insufficient to raise said vehicle by itself, said engine means further adapted to cause forcible expulsion of air from said aft orifice.

5. A vehicle as recited in claim 4, wherein said engine means comprises a high mass flow engine.

6. A vehicle as recited in claim 5, wherein a plurality of engines is employed within said housing.

7. A vehicle as recited in claim 4, further including a protective enclosure for at least one human passenger.

8. A vehicle as recited in claim 3, further including a protective enclosure for at least one human passenger.

* * * * *